United States Patent [19]
Beers et al.

[11] Patent Number: 5,922,153
[45] Date of Patent: Jul. 13, 1999

[54] TIRE INNERLINER COMPOSITION

[75] Inventors: Roger Neil Beers, Uniontown; David Andrew Benko, Munroe Falls; Bill Bud Gross, Stow; Adel Farhan Halasa, Bath, all of Ohio

[73] Assignee: The Goodyear Tire & Rubber Company, Akron, Ohio

[21] Appl. No.: 09/012,288

[22] Filed: Jan. 23, 1998

[51] Int. Cl.$^6$ ............................................. B60C 5/14
[52] U.S. Cl. .................. 152/510; 152/DIG. 16; 525/237
[58] Field of Search ..................... 152/510, 511, 152/504, DIG. 16; 525/236, 237

[56] References Cited

U.S. PATENT DOCUMENTS

| | | | |
|---|---|---|---|
| 4,725,649 | 2/1988 | Hoshino | 152/510 |
| 4,843,120 | 6/1989 | Halasa et al. | 525/53 |
| 5,005,625 | 4/1991 | Klemmensen et al. | 152/510 |
| 5,137,998 | 8/1992 | Hsu et al. | 526/174 |
| 5,178,702 | 1/1993 | Frerking, Jr. et al. | 152/510 |
| 5,491,196 | 2/1996 | Beers et al. | 525/237 |

*Primary Examiner*—Geoffrey L. Knable
*Attorney, Agent, or Firm*—Alvin T Rockhill

[57] ABSTRACT

A halobutyl rubber is generally used in the innerliner of pneumatic tires to retard the escape of air used to inflate the tire, thereby maintaining tire pressure. Since halobutyl rubbers, such as bromobutyl rubber, are generally the most expensive elastomers used in tires, it is desirable from a standpoint of cost reduction to reduce the level of halobutyl rubbers used in tires. The present invention relates to a technique for reducing the quantity of halobutyl rubber utilized in the innerliner of tubeless pneumatic vehicle tires. The present invention more specifically relates to a tire innerliner and pneumatic tires containing the same, which are prepared from a composition comprising, based on 100 parts by weight of rubber, a blend of (1) about 50 parts to about 90 parts of a halobutyl rubber and (2) about 10 parts to about 50 parts of a styrene-isoprene-butadiene terpolymer rubber having a first glass transition temperature which is within the range of about −110° C. to about −20° C. and a second glass transition temperature which is within the range of about −50° C. to about 0° C., wherein said styrene-isoprene-butadiene terpolymer rubber contains about 20 weight percent to about 40 weight percent bound styrene.

20 Claims, No Drawings

TIRE INNERLINER COMPOSITION

BACKGROUND OF THE INVENTION

Tubeless pneumatic tires typically contain an elastomeric composition designed to prevent or retard air used to inflate the tire from escaping from the inner air chamber, thereby maintaining the air pressure. This layer of rubber is often referred to as an innerliner because it is applied to the inner surface of the tire. Butyl and halobutyl rubber, which are relatively impermeable to air, are often used as the major rubber component of tire innerliners.

The innerliner is normally prepared by conventional calendering or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in the art.

Halobutyl rubber is generally one of the most expensive rubbers used in a tire. Given the competitive tire market and the continued need to lower the cost of manufacturing tires without sacrificing properties, there exists a need to eliminate or substantially decrease the cost of innerliners which perform such an important function in the performance of a tire.

Emulsion and solution polymerized styrene butadiene rubbers are commonly used in the tread portion of a tire. Since such styrene butadiene copolymers are typically more economical than halobutyl rubbers, one would hope that such styrene butadiene copolymers could be utilized in other components such as an innerliner. Unfortunately, typical styrene butadiene copolymers suffer from unacceptable air permeability. Since a rubber used in an innerliner must have acceptable air permeability, the use of a significant amount of styrene butadiene copolymer in an innerliner would be expected to meet with failure.

As can be appreciated by one skilled in the art, another critical property that an innerliner must exhibit is cold flexural properties. Simply stated, since an innerliner will be subject to low temperatures in use and that such temperatures along with the normal deformation of the innerliner lead to cracks, the elastomeric composition must exhibit good cold flexural properties to avoid cracks and, therefore, air leaks.

SUMMARY OF THE INVENTION

A halobutyl rubber is generally used in the innerliner of pneumatic tires to retard the escape of air used to inflate the tire, thereby maintaining tire pressure. Since halobutyl rubbers, such as bromobutyl rubber, are generally the most expensive elastomers used in tires, it is desirable from a standpoint of cost reduction to reduce the level of halobutyl rubbers used in tires. The present invention relates to a technique for reducing the quantity of halobutyl rubber utilized in the innerliner of tubeless pneumatic vehicle tires. The present invention more specifically relates to a tire innerliner and pneumatic tires containing the same, which are prepared from a composition comprising, based on 100 parts by weight of rubber, a blend of (1) about 50 parts to about 90 parts of a halobutyl rubber and (2) about 10 parts to about 50 parts of a styrene-isoprene-butadiene terpolymer rubber having a first glass transition temperature which is within the range of about −110° C. to about −20° C. and a second glass transition temperature which is within the range of about −50° C. to about 0° C., wherein said styrene-isoprene-butadiene terpolymer rubber contains about 20 weight percent to about 40 weight percent bound styrene.

The present invention further discloses a pneumatic tire which is comprised of a tread, sidewalls, a supporting carcass and an innerliner, wherein said innerliner is comprised of, based on 100 parts by weight of rubber, a blend of (1) about 50 parts to about 90 parts of a halobutyl rubber and (2) about 10 parts to about 50 parts of a styrene-isoprene-butadiene terpolymer rubber having a first glass transition temperature which is within the range of about −110° C. to about −20° C. and a second glass transition temperature which is within the range of about −50° C. to about 0° C., wherein said styrene-isoprene-butadiene terpolymer rubber contains about 20 weight percent to about 40 weight percent bound styrene.

DETAILED DESCRIPTION OF THE INVENTION

The tire innerliner compositions of this invention are comprised of about 50 parts to about 90 parts of a halobutyl rubber and about 10 parts to about 50 parts of a styrene-isoprene-butadiene terpolymer rubber having a first glass transition temperature which is within the range of about −110° C. to about −20° C. and a second glass transition temperature which is within the range of about −50° C. to about 0° C., wherein said styrene-isoprene-butadiene terpolymer rubber contains about 20 weight percent to about 40 weight percent bound styrene. The tire innerliner compositions of this invention will preferably contain from about 60 parts to about 80 parts of the halobutyl rubber and about 20 parts to about 40 parts of the styrene-isoprene-butadiene terpolymer rubber. It is typically most preferred for the tire innerliner compositions of this invention to contain from about 65 parts to about 70 parts of the halobutyl rubber and about 30 parts to about 35 parts of the styrene-isoprene-butadiene terpolymer rubber.

The halobutyl rubber component of the blend used in the innerliner is selected from the group consisting of chlorobutyl rubber, bromobutyl rubber and mixtures thereof. The term "chlorobutyl rubber" used herein generally means those rubbers obtained by chlorinating copolymers which are prepared from a polymerization mixture comprising isoolefins (e.g., isobutylene) and conjugated multiolefins (e.g., isoprene). The unmodified (nonchlorinated) copolymers are generally known as "butyl rubber."

Chlorinated butyl rubber may be prepared by contacting butyl rubber in a solution of 1 to 60 weight percent of butyl rubber in a substantially inert $C_5$–$C_8$ hydrocarbon solvent (e.g., pentane, hexane and heptane) with chlorine gas for about two seconds to about 25 minutes (see U.S. Pat. No. 3,099,644). The resultant chlorinated butyl rubber contains at least 0.5 weight percent based on copolymer and up to one chlorine atom per double bond initially present in the copolymer (see also U.S. Pat. No. 2,944,578).

The term "bromobutyl rubber" used herein means bromonated butyl rubber. Bromination may be carried out by contacting butyl rubber with bromine or appropriate bromine-containing compounds. The resultant bromonated butyl rubber contains about 0.5 to 3 bromine atoms per molecule of multiolefin. Typical brominating agents are molecular bromine, sodium hypobromite, sulfur bromide, N-bromosuccinimide, hydrogen bromide, etc. The bromination is advantageously conducted at temperatures of about −50° C. to about +150° C., preferably about 20° C. to 60° C.

for about one minute to several hours. The temperatures and time may be regulated so as to obtain the above bromine content.

The bromination may be carried out according to various methods. One method comprises preparing a solution of butyl rubber in a suitable unreactive organic solvent such as heptane, kerosene, toluene, chlorobenzene, trichloroethane, etc, and adding thereto gaseous or liquid bromine or a bromine compound. Another method comprises blending solid butyl rubber with a solid brominating agent such as N-bromosuccinimide which leads to allylic substitution. In such a case, the blend formed is preferably mill-mixed and advantageously heated to a temperature sufficient to brominate the solid butyl rubber. The milling pressure may be set higher or lower than atmospheric pressure, depending on the heating temperatures.

There are a number of commercial grades of halobutyl rubber which may be used in the present invention. For example, Exxon Corporation markets a bromobutyl rubber under the designation Exxon Bromobutyl 2222 which has a Mooney viscosity at 125° C. of 27–37 and 2 percent by weight percent of halogen. In addition, Polysar Ltd markets a bromobutyl rubber under the designations Polysar Bromobutyl 2030 and 2030G which have a Mooney viscosity at 125° C. of 26–36 and 2.1 percent by weight halogen.

In those instances where the producer of the innerliner desires to further lower the cost of production, one may substitute minor amounts of the halobutyl rubber with butyl rubber. Commercially available butyl rubber comprises a major proportion of isobutylene units and a minor proportion of isoprene units. Conventional high molecular weight butyl rubber generally has a number average molecular weight of about 25,000 to about 500,000, preferably about 80,000 to about 300,000, more preferably about 100,000 to about 250,000, and has a Wijs iodine number of about 0.5 to 50, preferably 1 to 20. Low molecular weight butyl rubber has a number average molecular weight of 5,000 to 25,000, and mole percent unsaturation of 2 to 10.

The butyl rubber may be substituted in amounts up to 10 parts by weight, based on 100 parts by weight of the overall blend. Therefore, from 0 to a total of 10 parts by weight of the chlorobutyl or bromobutyl rubber may be substituted with butyl rubber. In no instances should the level of chlorobutyl or bromobutyl rubber be below 50 parts by weight of the total rubber in the blend used to form the tire innerliner.

The styrene-isoprene-butadiene terpolymer rubber employed in the innerliners of this invention exhibit at least two glass transition temperatures and can be made by the technique described in U.S. Pat. No. 4,843,120 or U.S. Pat. No. 5,137,998. The teachings of these patents are incorporated herein by reference in their entirety.

The styrene-isoprene-butadiene terpolymer rubber (SIBR) is, of course, comprised of repeat units which are derived from styrene, isoprene and 1,3-butadiene. The monomer charge composition utilized in the synthesis of the SIBR will typically contain from about 20 weight percent to about 40 weight percent styrene, from about 20 weight percent to about 75 weight percent isoprene and from about 20 weight percent to about 75 weight percent 1,3-butadiene. It is normally preferred for the SIBR to contain from about 25 weight percent to about 35 weight percent styrene, from about 30 weight percent to about 60 weight percent isoprene and from about 30 weight percent to about 60 weight percent butadiene.

In synthesizing the SIBR, it is generally most preferred for the monomer charge composition to contain from about 20 weight percent to about 40 weight percent styrene, from about 35 weight percent to about 45 weight percent isoprene and from about 35 weight percent to about 45 weight percent butadiene. Since the polymerizations of this invention are normally carried out to completion, the ratio of monomers in the charge composition will be equivalent to the bound ratio of monomers in the SIBR terpolymer.

The polymerizations of the present invention will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer, styrene monomer and isoprene monomer. In most cases, it will be preferred for the polymerization medium to contain from 10 to 30 weight percent monomers. It is generally more preferred for the polymerization medium to contain 20 to 25 weight percent monomer.

Polymerization is started by adding an organolithium compound and an alkali metal alkoxide or tripiperidino phosphine oxide to the polymerization medium. Such polymerizations can be carried out utilizing batch, semi-continuous or continuous techniques. In a continuous process, additional monomer, catalyst and solvent are continuously added to the reaction vessel being utilized. The polymerization temperature utilized will typically be within the range of about −10° C. to about 40° C. It is normally preferred for the polymerization medium to be maintained at a temperature which is within the range of about 0° C. to about 30° C. throughout the polymerization. It is typically most preferred for the polymerization temperature to be within the range of about 10° C. to about 20° C. The pressure used will normally be sufficient to maintain a substantially liquid phase under the conditions of the polymerization reaction.

The polymerization is conducted for a length of time sufficient to permit substantially complete polymerization of monomers into SIBR. In other words, the polymerization is normally carried out until high conversions are realized. The polymerization can then be terminated using a standard procedure.

The organolithium compound which can be utilized includes organomonolithium compounds and organo multifunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1, 2-diphenylethane, 1,3,5,-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithium compounds which can be utilized are normally organomonolithium compounds. The organolithium compounds which are preferred can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The alkali metal in the alkali metal alkoxide can be potassium, rubidium or cesium. It is typically preferred for the alkali metal to be potassium. The alkali metal alkoxide will typically contain from about 2 to about 12 carbon atoms. It is generally preferred for the alkali metal alkoxide to contain from about 3 to about 8 carbon atoms. It is generally most preferred for the alkali metal alkoxide to contain from about 4 to about 6 carbon atoms. Potassium t-amyloxide (potassium t-pentoxide) is a highly preferred alkali metal alkoxide which can be utilized in the catalyst systems of this invention. In most cases, it is preferred for the member selected from the group consisting of tripiperidino phosphine oxide and alkali metal alkoxides to be tripiperidino phosphine oxide.

In the catalyst systems of this invention, the molar ratio of the tripiperidino phosphine oxide or the alkali metal alkoxide to the organolithium compound will typically be within the range of about 0.1:1 to about 6:1. It is generally preferred for the molar ratio of the alkali metal alkoxide or the tripiperidino phosphine oxide to the organolithium compound to be within the range of about 0.4:1 to about 2:1. Molar ratios within the range of about 0.8:1 to about 3:2 are most preferred.

The amount of catalyst employed will be dependent upon the molecular weight which is desired for the SIBR being synthesized. As a general rule with all anionic polymerizations, the molecular weight of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

SIBR made by the process of this invention has multiple glass transition temperatures. It exhibits a first glass transition temperature which is between about −110° C. and about −20° C. It has also exhibits a second glass transition temperature which is between −50° C. and 0° C. In many cases, the SIBR also exhibits a third glass transition temperature which is within the range of about −20° C. to 20° C. In most cases, the SIBR will have a first glass transition temperature which is within the range of −100° C. to −60° C. and a second glass transition temperature which is within the range of −25° C. to 10° C. It is generally most preferred for the SIBR to have a first glass transition temperature which is within the range of −90° C. to −75° C. and a second glass transition temperature which is within the range of −10° C. to 0° C. The glass transition temperatures referred to herein are as determined by differential scanning calorimetry using a Dupont thermal analyzer with a heating rate of 50° C. per minute and sample size of 8 mg.

The multiple glass transition temperatures of the SIBR is attributable to polymeric segments within the SIBR which have different microstructures and different monomeric ratios. It has been determined that, in the polymerizations of this invention, styrene is the most reactive monomer with butadiene being somewhat less reactive and with isoprene being much less reactive. This means that the initial polymer segments formed are rich in styrene and butadiene with relatively few repeat units in the initial segments being derived from isoprene. However, toward the end of the polymerization, the supply of styrene monomer is essentially exhausted and polymer segments containing repeat units which are derived almost entirely from butadiene and isoprene result. Because isoprene has the lowest relative rate of reactivity, the final polymer segments formed will be relatively rich in isoprene repeat units. In the area between the two ends of the polymer chains, there is normally a transition zone. Such a transition zone has a microstructure and a monomer content which is intermediate to the two polymeric segments at opposite ends of the SIBR polymer. In effect, the microstructure and monomeric make-up of the polymer in this transition zone is tapered.

The blend of rubber for use as a tire innerliner will typically contain at least about 10 parts by weight of the SIBR. However, when used in amounts of less than 30 parts, the economic incentives of the present invention are diminished. In cases where the SIBR is employed in amounts greater than about 40 parts, undesirable properties result in terms of unacceptable oxygen permeability and inferior cold flex properties.

The blend of SIBR and halobutyl rubber may be compounded with conventional rubber compounding ingredients known for use in innerliners. Conventional ingredients commonly used in rubber vulcanizates are, for example, carbon black, hydrocarbon resins, phenol-formaldehyde resins, zinc oxide, processing aids, antioxidants, antiozonants, stearic acid, activators, waxes, oils and peptizing agents. As known to those skilled in the art, the above ingredients are commonly used in conventional amounts. Carbon black will typically be employed in an amount which is within the range of 10 phr (parts per 100 parts by weight of rubber) to 100 phr. The carbon black will preferably be employed in an amount which is within the range of about 50 phr to about 75 phr. Conventional carbon blacks having the ASTM Designations N330, N660, N774, N907, N908, N990 and N991 may be used. Typical amounts of tackifier or hydrocarbon resins employed will typically be within the range of about 2 phr to about 10 phr. Processing aids will typically be utilized in amounts that are within the range of about 1 phr to about 5 phr. Antioxidant will generally be utilized in amounts which are within the range of about 1 phr to about 10 phr and antiozonants will typically be employed in amounts which are within the range of about 1 phr to 10 phr. Typical amounts of stearic acid comprise 0.50 to 2 phr. Typical amounts of zinc oxide comprise 1 to 5 phr. Typical amounts of waxes comprise 1 to 5 phr. Typical amounts of oils comprise 2 to 30 phr. Typical amounts of phenol-formaldehyde resin comprise from 1 to 10 phr. Typical amounts of peptizers comprise 0.1 to 1 phr.

The vulcanization of the composition for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. Preferably, the sulfur vulcanizing agent is elemental sulfur. As known to those skilled in the art, sulfur vulcanizing agents are used in amounts ranging from 0.2 to 8.0 phr with a range of from 0.5 to 5.0 being preferred.

Accelerators are used to control the time and/or temperature required for vulcanization and to improve the properties of the vulcanizate. A single accelerator system may be used, i.e., primary accelerator in conventional amounts ranging from 0.3 to 5.0 phr. In the alternative, combinations of two or more accelerators may be used which may consist of a primary accelerator which is generally used in the larger amount (0.3 to 5.0 phr), and a secondary accelerator which is generally used in smaller amounts (0.05–1.0 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not effected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. Preferably, the primary accelerator is a disulfide or sulfenamide. If a secondary accelerator is used, the secondary accelerator is preferably a guanidine, disulfide, dithiocarbamate or thiuram compound.

In practice, the above rubber compositions are used to form a layer or sheet. As known to those skilled in the art, the layer is produced by a press or passing a rubber composition through a mill, calender, multihead extruder or other suitable means. Preferably, the layer is produced by a calender because greater uniformity is believed to be provided. The uncured layer sheet is then constructed as an inner surface (exposed inside surface) of an uncured rubber tire structure, also known as the carcass. The innerliner is then sulfur-cocured with the tire carcass during the tire curing operation under conditions of heat and pressure. Vulcanization of the tire containing the innerliner of the present invention is generally carried out at temperatures of between 100° C. and 200° C. Preferably, the vulcanization is conducted at temperatures ranging from 110° C. to 180° C. Any of the usual vulcanization processes may be used, such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being cocured therewith as compared to being a simple adherent laminate. Typically, the innerliner of the present invention has an uncured gum thickness in the range of from 0.04–0.4 centimeters. Preferably, the innerliner has an uncured gum thickness in the range of from 0.08 to 0.02 centimeters. As a cured innerliner, the innerliner may have a thickness ranging from 0.02 to 0.35 centimeters. Preferably, as a cured innerliner, the thickness will range from 0.04 to 0.15 cm thickness.

The pneumatic tire with the integral innerliner may be constructed in the form of a passenger tire, truck tire or other type of bias or radial pneumatic tire. Such tires will include a tread, sidewalls, a supporting carcass and, of course, the innerliner.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE

In this experiment, blends of various rubbers with bromobutyl rubber were prepared to compare and contrast various aspects of the present invention. The samples were tested for their oxygen permeability and cold flex properties. The oxygen permeabilities were measured on a MoCon Oxytran 10/50 coulemetric instrument following ASTM D-3985-1. The cold flex test method was conducted using a Monsanto fleximeter or similar servohydraulic test equipment. Each sample size was 7.62 cm long, 2.54 cm wide and 12.7 mm thick. The test was conducted at −40° C. at a strain level of 12.5 percent and a frequency of 5 Hz. The test was conducted for a total of 6,000 cycles and the sample was rated as pass or fail. Failure constitutes any cracking, tearing or complete separation prior to completion of the 6,000 cycles. Pass means no damage occurred to the sample during the test.

In this series of experiments, a solution styrene-butadiene rubber (SSBR), a comb polymer with a polybutadiene backbone and styrene-butadiene arms, an SIBR containing about 30 percent bound styrene and an SIBR containing about 20 percent bound styrene were evaluated alone and in blends with bromobutyl rubber. The microstructure of the various rubbers evaluated is shown in Table I. The SIBR rubbers evaluated had a first glass transition temperature (Tg) at −82° C. and a second Tg at between −10° C. and 0° C. The bromobutyl rubber used were EXXON Bromobutyl 2222 or Polysar Bromobutyl 2030. The respective oxygen permeabilities of the blends are shown in Table II with cold flex results being provided in Table III. The permeability indices shown in Table II are normalized to a bromobutyl rubber (BIIR) sample. In other words, bromobutyl rubber has a permeability index of 1.0.

TABLE I

| Polymer | Tg | Styrene | 1,2-PBD | 1,4-PBD | 1,4-PI | 3,4-PI | 1,2-PI |
|---------|-----|---------|---------|---------|--------|--------|--------|
| SSBR    | −24 | 30      | 43      | 27      |        |        |        |
| Comb    | −28 | 32      | 25      | 43      |        |        |        |
| SIBR    | −82 | 28      | 8       | 23      | 4      | 22     | 15     |
| SIBR    | −82 | 19      | 12      | 25      | 4      | 25     | 15     |

TABLE II

Permeability Index of Blends Compared to Bromobutyl Rubber

| Blend Ratio | S-SBR | SIBR (30% BS) | SIBR (20% BS) | Comb |
|-------------|-------|---------------|---------------|------|
| 80/20       | 1.62  | 1.51          | 2             | 1.86 |
| 70/30       | 1.78  | 1.77          | 2.05          | 2.09 |
| 60/40       | 2.46  | 2.08          | 2.91          | 2.6  |
| 100         | 5.81  | 3.88          | 6.4           | 6.11 |

TABLE III

| Properties | 30 S-SBR 70 BR | 30 SIBR (20%) 70 BR | 30 SIBR (30%) 70 BR | 30 Comb 70 BR | 25 NB 75 BR |
|------------|----------------|---------------------|---------------------|---------------|-------------|
| Tensile (Mpa) | 9.02 | 8.94 | 8.97 | 9.25 | 9.72 |
| Elong (%)  | 811 | 845 | 814 | 804 | 566 |
| 100% Mod (Mpa) | 1.21 | 1.16 | 1.49 | 1.3 | 1.28 |
| 300% Mod (Mpa) | 2.86 | 2.72 | 3.08 | 3.27 | 5.4 |
| Hardness   | 61 | 60 | 72 | 58 | 50 |
| ML1 + 4    | 58 | 56 | 54 | 59 | 47 |
| Tel Tak (psi) | 32 | 29 | 35 | 3A | 51 |
| Hot PG Flex | .20/240 | .13/240 | .16/240 | .85/240 | .03/240 |

TABLE III-continued

| Properties | 30 S-SBR 70 BR | 30 SIBR (20%) 70 BR | 30 SIBR (30%) 70 BR | 30 Comb 70 BR | 25 NB 75 BR |
|---|---|---|---|---|---|
| (in/min) Adhesion To Self, 95° C. (N) | 122 | 106 | 84 | 101 | 112 |
| Research Flex 12.5 % E, −40° C. | Pass | Pass | Pass | Pass | Pass |
| Zwick Rebound | | | | | |
| Hot (%) | 49.8 | 50.2 | 50.4 | 51.8 | 48.9 |
| Cold (%) | 15.6 | 12 | 13 | 17.6 | 20.6 |

Of the four rubbery polymers tested, the lowest oxygen permeability was obtained with the SIBR containing 30 percent bound styrene. This was true when tested alone, or in blends with bromobutyl rubber. The permeability values of the four polymers when blended with bromobutyl rubber at 40 parts are about two to three times higher than bromobutyl rubber alone or approximately equal to the value of a 75 percent/25 percent blend of bromobutyl rubber with natural rubber (NR). Thus, the permeability values are about the same as bromobutyl rubber/natural rubber blends that are used as innerliner compounds.

Additionally, the 70 percent/30 percent bromobutyl rubber blend exhibited good tack, adhesion, modulus and passed the flex test at 12.5 percent elongation at −40° C. In other words, the blends of this invention that contain 40 percent of the SIBR exhibit permeability and low temperature properties which are equal to or better than innerliner compounds which are blends containing 75 percent bromobutyl rubber and 25 percent natural rubber.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire innerliner prepared from a composition whose rubber component consists of, based on 100 parts by weight of rubber, a blend of (1) about 50 parts to about 90 parts of a halobutyl rubber and (2) about 10 parts to about 50 parts of a styrene-isoprene-butadiene terpolymer rubber having a first glass transition temperature which is within the range of about −110° C. to about −20° C. and a second glass transition temperature which is within the range of about −50° C. to about 0° C., wherein said styrene-isoprene-butadiene terpolymer rubber contains about 20 weight percent to about 40 weight percent bound styrene.

2. A tire innerliner as specified in claim 1 wherein said halobutyl rubber is selected from the group consisting of chlorobutyl rubber, bromobutyl rubber and mixtures thereof.

3. A tire innerliner as specified in claim 2 wherein the styrene-isoprene-butadiene rubber contains from about 20 weight percent to about 75 weight percent isoprene and from about 20 weight percent to about 75 weight percent 1,3-butadiene.

4. A tire innerliner as specified in claim 3 wherein the styrene-isoprene-butadiene rubber has a first glass transition temperature which is within the range of −100° C. to −60° C.

5. A tire innerliner as specified in claim 4 wherein said blend contains from about 60 parts to about 80 parts of the halobutyl rubber and from about 20 parts to about 40 parts of the styrene-isoprene-butadiene rubber.

6. A tire innerliner as specified in claim 5 wherein the styrene-isoprene-butadiene rubber contains from about 25 weight percent to about 35 weight percent styrene, from about 30 weight percent to about 60 weight percent isoprene and from about 30 weight percent to about 60 weight percent butadiene.

7. A tire innerliner as specified in claim 6 wherein the styrene-isoprene-butadiene rubber has a first glass transition temperature which is within the range of −90° C. to −75° C. and a second glass transition temperature which is within the range of −10° C. to 0° C.

8. A tire innerliner as specified in claim 7 wherein the halobutyl rubber is bromobutyl rubber.

9. A tire innerliner as specified in claim 8 wherein said blend contains from about 65 parts to about 70 parts of the bromobutyl rubber and from about 30 parts to about 35 parts of the styrene-isoprene-butadiene rubber.

10. A tire innerliner as specified in claim 9 wherein the styrene-isoprene-butadiene rubber has a third glass transition temperature which is within the range of −20° C. to 20° C.

11. A pneumatic tire which is comprised of a tread, sidewalls, a supporting carcass and an innerliner, wherein said innerliner is prepared from a composition whose rubber component consists of, based on 100 parts by weight of rubber, a blend of (1) about 50 parts to about 90 parts of a halobutyl rubber and (2) about 10 parts to about 50 parts of a styrene-isoprene-butadiene terpolymer rubber having a first glass transition temperature which is within the range of about −110° C. to about −20° C. and a second glass transition temperature which is within the range of about −50° C. to about 0° C., wherein said styrene-isoprene-butadiene terpolymer rubber contains about 20 weight percent to about 40 weight percent bound styrene.

12. A pneumatic tire as specified in claim 11 wherein said halobutyl rubber is selected from the group consisting of chlorobutyl rubber, bromobutyl rubber and mixtures thereof.

13. A pneumatic tire as specified in claim 12 wherein the styrene-isoprene-butadiene rubber contains from about 20 weight percent to about 75 weight percent isoprene and from about 20 weight percent to about 75 weight percent 1,3-butadiene.

14. A pneumatic tire as specified in claim 13 wherein the styrene-isoprene-butadiene rubber has a first glass transition temperature which is within the range of −100° C. to −60° C.

15. A pneumatic tire as specified in claim 14 wherein said blend contains from about 60 parts to about 80 parts of the halobutyl rubber and from about 20 parts to about 40 parts of the styrene-isoprene-butadiene rubber.

16. A pneumatic tire as specified in claim 15 wherein the styrene-isoprene-butadiene rubber contains from about 25 weight percent to about 35 weight percent styrene, from about 30 weight percent to about 60 weight percent isoprene and from about 30 weight percent to about 60 weight percent butadiene.

17. A pneumatic tire as specified in claim 16 wherein the styrene-isoprene-butadiene rubber has a first glass transition temperature which is within the range of −90° C. to −75° C. and a second glass transition temperature which is within the range of −10° C. to 0° C.

18. A pneumatic tire as specified in claim 17 wherein the halobutyl rubber is bromobutyl rubber.

19. A pneumatic tire as specified in claim 18 wherein said blend contains from about 65 parts to about 70 parts of the bromobutyl rubber and from about 30 parts to about 35 parts of the styrene-isoprene-butadiene rubber.

20. A pneumatic tire as specified in claim 19 wherein the styrene-isoprene-butadiene rubber has a third glass transition temperature which is within the range of −20° C. to 20° C.

* * * * *